(12) United States Patent
Moore et al.

(10) Patent No.: US 10,613,789 B1
(45) Date of Patent: Apr. 7, 2020

(54) ANALYTICS ENGINE USING CONSISTENT REPLICATION ON DISTRIBUTED SITES

(71) Applicant: EMC IP Holding Company LLC, Hopkinton, MA (US)

(72) Inventors: James J. Moore, Los Angeles, CA (US); Sorin Faibish, Newton, MA (US); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/230,818

(22) Filed: Mar. 31, 2014

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS

| | | | | |
|---|---|---|---|---|
| 5,729,735 | A * | 3/1998 | Meyering | G06F 11/1451 |
| 6,907,237 | B1 * | 6/2005 | Dorenbosch | H04W 24/00 |
| | | | | 455/404.1 |
| 2003/0200207 | A1 * | 10/2003 | Dickinson | G06F 8/68 |
| 2005/0108485 | A1 * | 5/2005 | Perego | G06F 3/0607 |
| | | | | 711/162 |
| 2009/0313503 | A1 * | 12/2009 | Atluri | G06F 11/1453 |
| | | | | 711/162 |
| 2010/0241827 | A1 * | 9/2010 | Yu | H04L 12/44 |
| | | | | 712/30 |
| 2011/0066649 | A1 * | 3/2011 | Berlyant | G06F 9/5066 |
| | | | | 707/770 |
| 2014/0047263 | A1 * | 2/2014 | Coatney | G06F 11/2023 |
| | | | | 714/4.11 |
| 2014/0082619 | A1 * | 3/2014 | Yoshida | G06F 11/1484 |
| | | | | 718/1 |
| 2015/0106802 | A1 * | 4/2015 | Ivanov | G06F 9/45558 |
| | | | | 718/1 |

* cited by examiner

*Primary Examiner* — Sean D Rossiter
*Assistant Examiner* — Stephanie Wu
(74) *Attorney, Agent, or Firm* — Ryan, Mason & Lewis, LLP

(57) ABSTRACT

A computer-executable method, system, and computer program product for processing data on a data storage system including a primary data storage system and a secondary data storage system, the computer-executable method, system, and computer program product comprising replicating the primary data storage system on the secondary data storage system, processing a mapping of the data on the primary data storage system, wherein a result of the mapping is replicated on the secondary data storage system, and processing a portion of reducing of the data on the secondary data storage system.

20 Claims, 10 Drawing Sheets

ANALYTICS ENGINE USING CONSISTENT REPLICATION ON DISTRIBUTED SITES

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for processing data on a data storage system including a primary data storage system and a secondary data storage system, the computer-executable method, system, and computer program product comprising replicating the primary data storage system on the secondary data storage system, processing a mapping of the data on the primary data storage system, wherein a result of the mapping is replicated on the secondary data storage system, and processing a portion of reducing of the data on the secondary data storage system.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
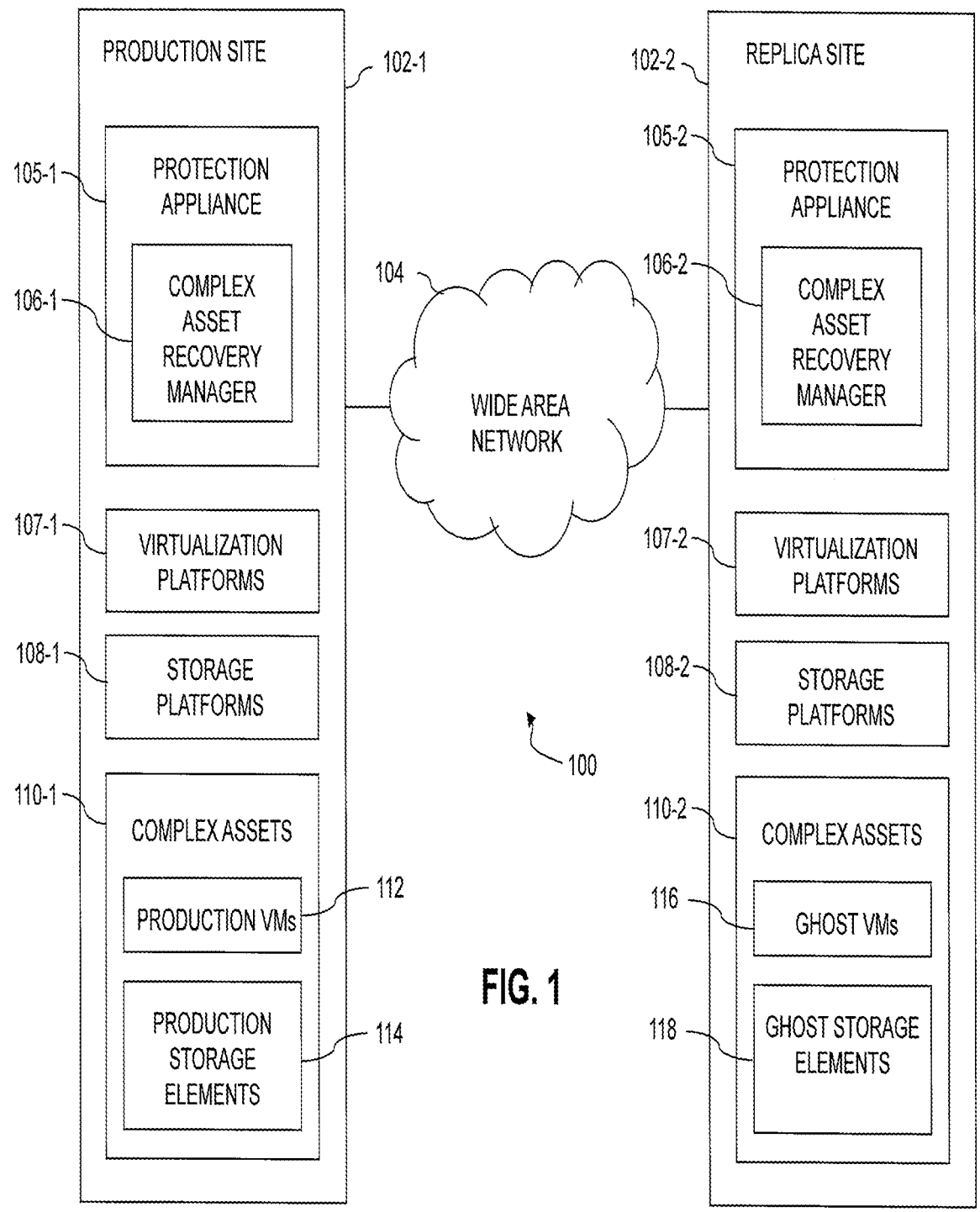
FIG. 1 is a block diagram showing a distributed information processing system having complex asset recovery functionality in an illustrative embodiment of the invention.

Traditionally, case analytic engines running map-reduce search algorithms run both the map and reduce phases of the algorithm within the same cloud. Generally, mapping and reducing computing power are run on the same cloud to minimize movement of the large amounts of data being mapped and reduced. Conventionally, large amounts of data takes a long time to copy between sites and/or clouds. Typically, enabling distributed processing for case analytic engines may not have been possible.

In many embodiments, the current disclosure may enable use of complex assets consistently replicated to other complex assets for processing map-reduce search algorithms. In various embodiments, the current disclosure may enable one or more portions of the processing map-reduce search algorithms to be completed on two or more complex assets replicated from a primary asset. In certain embodiments, the current disclosure may enable mapping to be completed on a primary complex asset and a reduce completed on one or more secondary assets that may be replicated from the primary complex asset.

In many embodiments, a complex asset may be configured so as to comprise one or more virtual machines provided by one or more hypervisors of a virtualization platform, and at least one storage element provided by a storage platform. In various embodiments, a complex asset may comprise multiple virtual machines and one or more associated external storage volumes that may or may not be visible to or controllable by a corresponding virtual machine hypervisor. It should be noted that the term "storage element" as used herein is intended to be broadly construed so as to encompass a virtual disk provided by a virtualization platform, as well as a storage element provided by a storage platform but in a manner not visible to any hypervisor of the virtualization platform. In many embodiments, the multiple virtual machines associated with a given complex asset may comprise a set of virtual machines that are running a single application together. Numerous other arrangements of virtual machines and associated storage elements may be used in a complex asset as that term is broadly used herein.

In many embodiments, the current disclosure may enable enhancement and/or extension of the use of complex assets replication using technology, including, but not limited to, EMC Recover Point and/or other replication technologies. In various embodiments, Complex assets consistently replicated may enable optimized use of each complex asset for the purpose of accelerating search engines by separation of map from reduce in such a way that may allow the reduce phase to run on larger number of clusters in parallel. In certain embodiments, the current disclosure may enable use of complex asset based on availability of resources and/or time constraints.

In other embodiments, the current disclosure may enable one or more replicated complex assets running in one site to instantly start switchover processing to several sites during the map and/or reducing processing. In some embodiments, the current disclosure may enable a complex asset to take a checkpoint as map processing completes, and may enable the system to signal and start the reduce phase of the processing on one or more secondary complex assets replicated form the original complex asset. In many embodiments, secondary complex assets, which may be used to replicate primary complex assets, may include higher performance hardware which may be enabled to accelerate the reduce and/or mapping phase. In various embodiments, one or more secondary complex assets replicated from a primary complex asset may be enabled to separate a reduce phase into several sites. In certain embodiments, the current disclosure may enable distribution of analysis of one or more data sets to one or more sites including secondary complex assets replicated from a primary complex asset.

In many embodiments, the current disclosure may enable processing of a mapping or a reducing phase when resources may be available. In various embodiments, a Map-reduce algorithm may be migrated from a primary system to one or more secondary systems, that may be replicated from the primary system, when secondary systems become available. In various embodiments, a Map-reduce algorithm may be migrated from a primary system to one or more secondary systems to minimize the expense of using secondary systems. For example, in an embodiment, when the initial asset runs on old storage system that may need to be decommissioned and continue the reduce phase on a faster storage on another site or even on same site during the upgrade.

In various embodiments, the current disclosure may enable optimized use of complex assets by enabling a secondary complex asset to complete a job which may enable a primary asset to complete another high priority job. In certain embodiments, migration of jobs and/or processing from a primary to secondary complex assets may be completed by user direction. In other embodiments, an administrator may be required to migrate jobs and/or processing from a primary to secondary complex asset. In other embodiments, processing on a complex asset may automatically switchover to secondary complex assets upon completion of one or more designated events. In many embodiments, the current disclosure may enable migration of processing of data to multiple replicas of the data, such as on Recover Point replication engines.

Refer to the example embodiment of FIG. 1. FIG. 1 is a block diagram showing a distributed information processing system having complex asset recovery functionality in an illustrative embodiment of the invention. FIG. 1 shows a distributed information processing system 100 configured in accordance with an illustrative embodiment of the invention. The system 100 comprises a production site 102-1 that communicates with a replica site 102-2 over a network 104. The production and replica sites 102 are examples of what are more generally referred to herein as respective first and second sites of a distributed information processing system. Numerous other types and arrangements of multiple sites may be used in other embodiments, and such sites may be configured to implement similar functionality. For example, although site 102-1 is shown as a production site relative to replica site 102-2 in this embodiment, site 102-1 may additionally serve as a replica site relative to site 102-2 operating as a production site. In addition, a given one of the sites 102-1 or 102-2 may be configured to serve as a replica site for each of multiple production sites of a distributed information processing system.

The network 104 may comprise, for example, a global computer network such as the Internet, a wide area network (WAN), a local area network (LAN), a software defined network (SDN), a satellite network, a telephone or cable network, a cellular network, a wireless network such as WiFi or WiMAX, a network comprising virtual network switches, or various portions or combinations of these and other types of networks.

The sites 102-1 and 102-2 comprise respective protection appliances 105-1 and 105-2 implementing respective complex asset recovery managers 106-1 and 106-2. The protection appliances 105 are assumed in the present embodiment to be configured to support journaling functionality similar to that described in U.S. Pat. Nos. 7,516,287 and 7,627,612, both entitled "Methods and Apparatus for Optimal Journaling for Continuous Data Replication," which are commonly assigned herewith and incorporated by reference herein.

The complex asset recovery managers 106, although shown as elements of the protection appliances 105 in the present embodiment, may in other embodiments be implemented at least in part using an external controller, that is, a controller that is external to one or both of the sites 102. Such an external controller need not be part of any data recovery appliance, but may instead be part of a virtualization platform, a storage platform, a distributed resource management system, or another system component. Accordingly, the functionality associated with an external controller or other implementation of one or more complex asset recovery managers may be distributed over multiple system components, such that there is no single identifiable component providing all of the associated functionality.

The sites 102-1 and 102-2 further comprise respective virtualization platforms 107-1 and 107-2, each of which may comprise one or more hypervisors. An example of a commercially available virtualization platform that may be used in one or more embodiments of the invention is the VMware® vSphere™ which may have an associated virtual infrastructure management system such as the VMware® vCenter™. Other types of virtualization platforms that may be used include Microsoft Hyper-V Server, Linux KVM and/or XEN Hypervisors.

The protection appliances 105 may be implemented at least in part using respective hypervisors of the virtualization platforms 107 of the production and replica sites. At least one of the protection appliances 105 may comprise a splitter configured to facilitate replication of a given portion of a complex asset at the replica site. In an example of an arrangement of this type, each of a plurality of hypervisors of the virtualization platform 107-1 provides one or more virtual machines that collectively run a particular application at the production site 102-1, and each of the hypervisors further comprises a separate splitter. The protection appliance 105-1 may also be implemented on one of these hypervisors.

The sites 102-1 and 102-2 also comprise respective storage platforms 108-1 and 108-2. These storage platforms may be implemented, for example, using storage products such as VNX and Symmetrix VMAX, both commercially available from EMC Corporation of Hopkinton, Mass. A variety of other products may be utilized to implement at least a portion of the storage platforms 108. For example, storage platform functionality may be incorporated within a virtualization platform product.

It should be noted that at least portions of the complex asset recovery managers 106 may be implemented in other elements of the sites 102, such as in virtualization platforms 107 or storage platforms 108 of the sites.

Associated with the production site 102-1 are complex assets 110-1 that illustratively include production virtual machines (VMs) 112 and production storage elements 114. The replica site 102-2 comprises corresponding complex assets 110-2 that include ghost virtual machines 116 corresponding to respective ones of the production virtual machines 112 and ghost storage elements 118 corresponding to respective ones of the production storage elements 114. These virtual machines 116 and storage elements 118 are referred to as respective "ghost" elements prior to bringing at least a portion of them into a fully operational status in conjunction with recovery of a failure in one of the corresponding complex assets 110-1 of the production site 102-1.

The protection appliances 105 and their associated complex asset recovery managers 106 are utilized in configuring the ghost virtual machines 116 and ghost storage elements 118 of the replica site in a manner that facilitates recovery from a failure in one of the complex assets 110-1 of the production site. The protection appliances 105 may each run on a computer, server or other processing platform element, which may be viewed as an example of what is more generally referred to herein as a "processing device."

Figure 2:
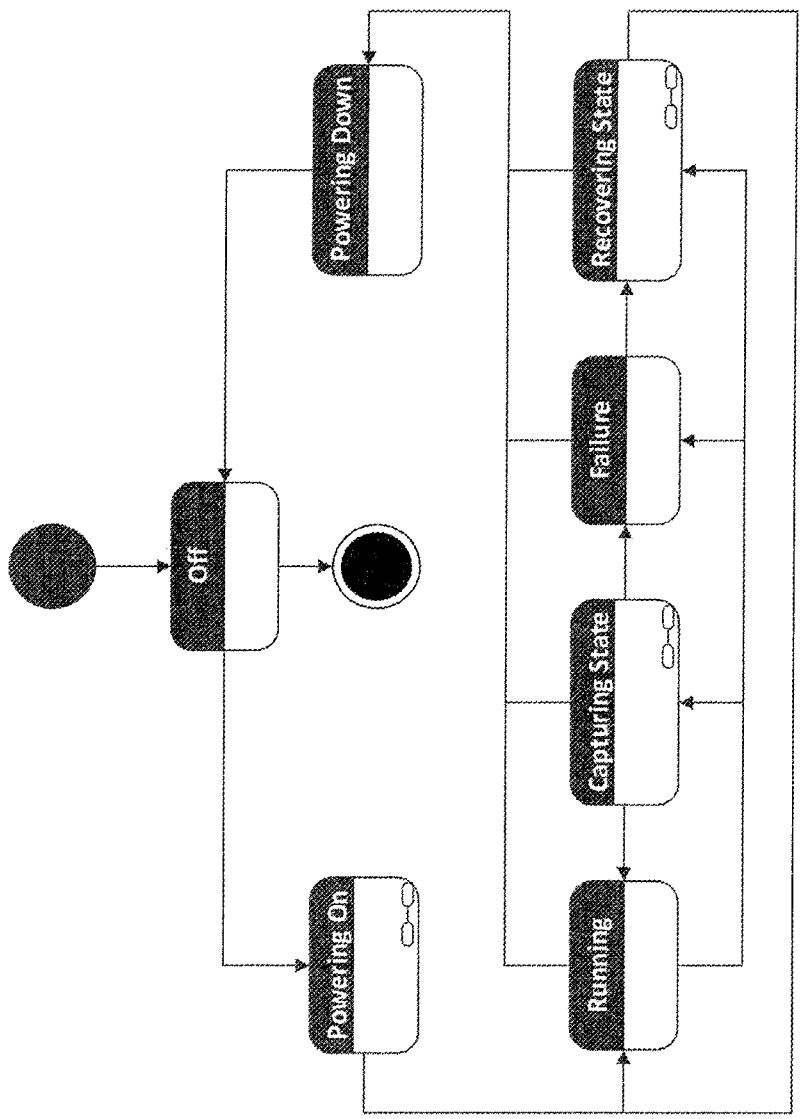
FIG. 2 is a simplified illustration of a complete state diagram for complex asset life, in accordance with an embodiment of the present disclosure.

Refer to the example embodiment of FIG. 2. FIG. 2 is a simplified illustration of a complete state diagram for complex asset life, in accordance with an embodiment of the present disclosure. From an Off state, the complex asset can transition to a powering on state. The Off state is entered from a powering down state. Additional states of a complex asset includes Running, capturing state, failure, and recovering state.

In FIG. 2, a complex asset can transition to a running state. From a running state, a complex asset may be periodically transitioned to a capturing state. In many embodiments, a complex asset may be periodically captured and replicated on one or more secondary systems. In various embodiments, a complex asset may be continually captured and replicated on one or more secondary systems. A complex asset can transition to a failure state. From a failure state, a complex asset can transition to a recovering state in attempts to transition to a running state again. In many embodiments, a recovering state may mean that processing has switched over from a primary complex asset to a secondary complex asset while the primary complex asset is being restored to a previous captured state.

Figure 3:
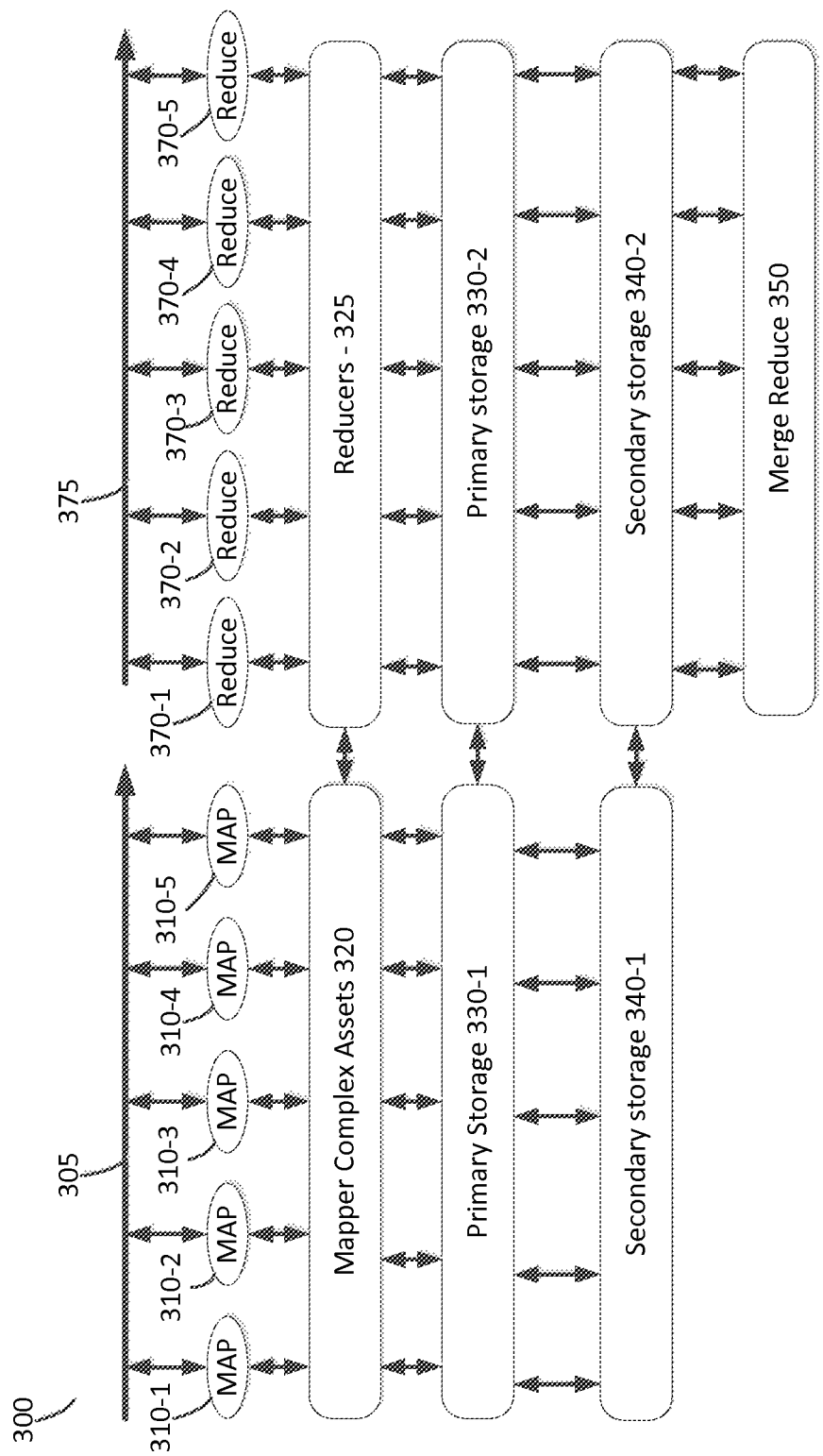
FIG. 3 is a simplified illustration of multiple complex systems processing data using a map-reduce algorithm, in accordance with an embodiment of the present disclosure.

Refer to the example embodiments of FIG. 3. FIG. 3 is a simplified illustration of multiple complex systems processing data using a map-reduce algorithm, in accordance with an embodiment of the present disclosure. As shown, data processing system 300 includes mapper complex assets 320, primary storage 330-1, 330-2, secondary storage 340-1, 340-2, and a merge reduce node 350. In this embodiment, input data 305 is split into five portions of data. Portions 310-1, 310-2, 310-3, 310-4, and 310-5 are enabled to be processed on mapper complex assets 320. Mapper complex assets 320 includes at least 5 compute nodes enabled to map data portions 310-1, 310-2, 310-3, 310-4, 310-5. During the map processing, Mapper complex assets 320 stores results in primary storage 330-1. Primary storage 330-1 include fast storage devices. As required, primary storage 330-1 migrates stored results to secondary storage 340-1.

In this embodiment, Mapper Complex Assets 320, primary storage 330-1, and secondary storage 340-1 are continually being replicated to reducers 325, primary storage 330-2, and secondary storage 340-2. When Mapper complex assets 320 completes mapping data portions 310-1, 310-2, 310-3, 310-4, 310-5, mapper complex assets 320 are enabled to instantly switchover to reducers 325, primary storage 330-2, and secondary storage 340-2. In many embodiments, a secondary system may be enabled to process reduction faster than a mapping process, and/or vice versa. Reducer input 375 is split into 5 data portions 370-1, 370-2, 370-3, 370-4, and 370-5. Reducers 325 is immediately enabled to start processing data portions 370-1, 370-2, 370-3, 370-4, 370-5 as primary storage 330-2 and secondary storage 340-2 includes the same mapping results data as primary storage 330-1 and secondary storage 340-1. Reducers 325 stores results from reducing data portions 370-1, 370-2, 370-3, 370-4, 370-5 on primary storage 330-2. Primary storage 330-2 migrates completed results to secondary storage 340-2 as needed. As shown, once reducers—325 has completed reducing, node 350 merges the resulting data from the reduce onto a single node.

Figure 4:
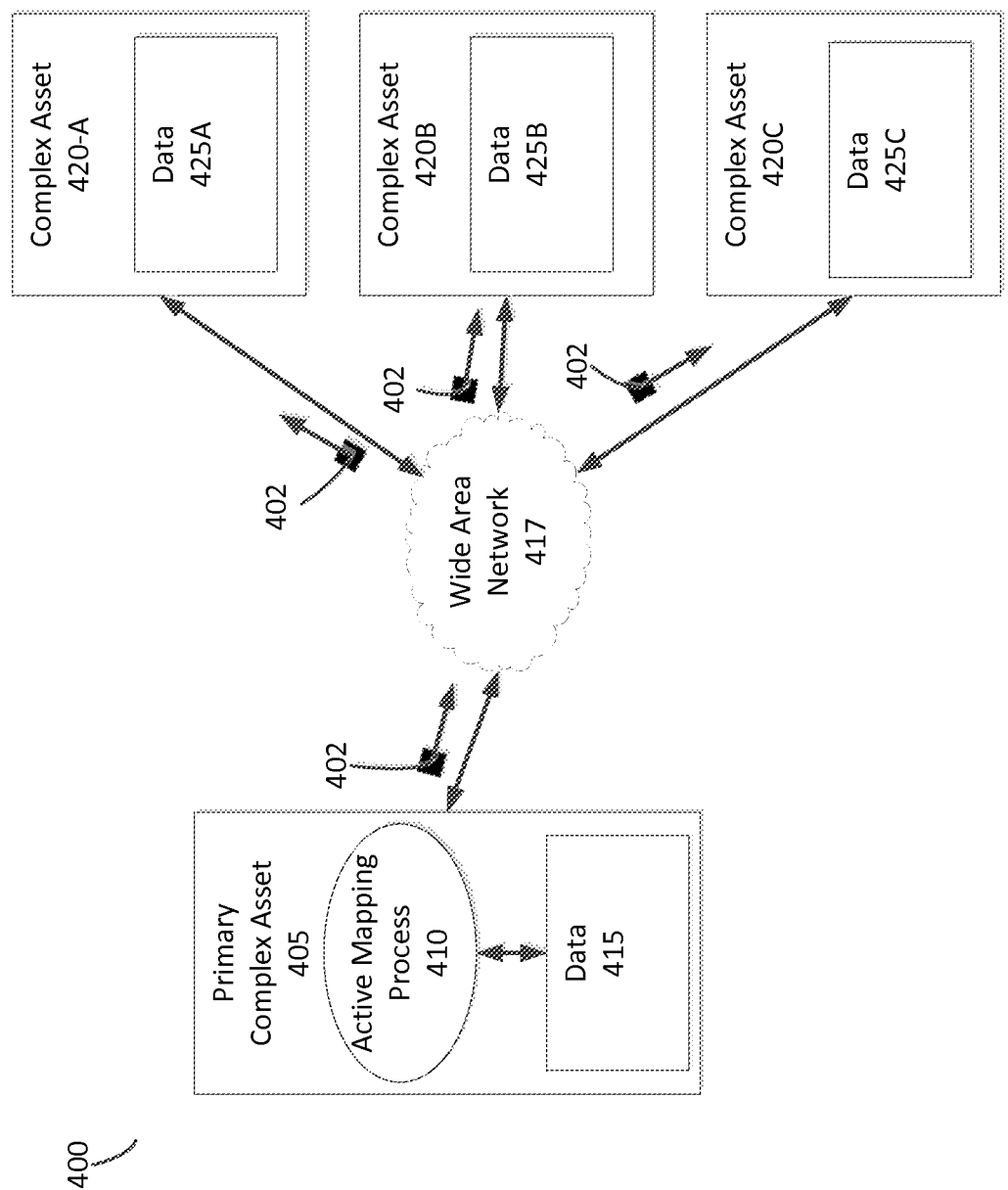
FIG. 4 is a simplified illustration of a complex asset mapping data in a multi complex asset data storage system, in accordance with an embodiment of the present disclosure.

Refer to the example embodiment of FIG. 4. FIG. 4 is a simplified illustration of a complex asset mapping data in a multi complex asset data storage system, in accordance with an embodiment of the present disclosure. Multi complex asset data storage system 400 includes primary complex asset 405 and complex assets (420-A-C, 420 generally). Primary complex asset 405 and complex assets 420 are in communication with each other through wide area network (WAN) 417. Primary asset 405 is replicated on complex assets 420.

As shown, Primary complex asset 405 includes data 415. Multi complex asset data storage system 400 sends replication information through WAN 417 using message 402. Message 402 is received by complex assets 420, which enable each complex asset to replicate primary complex asset 405. Complex Asset 420-A include data 425A, complex asset 420B includes 425B, and complex asset 420C includes data 425C. As shown, data 425A-C replicated versions of data 415. In this embodiment, primary complex asset 405 is executing active mapping process 410 using data 415. While mapping, primary complex asset 405 is modifying data 415 with results from active mapping process 410.

Figure 5:
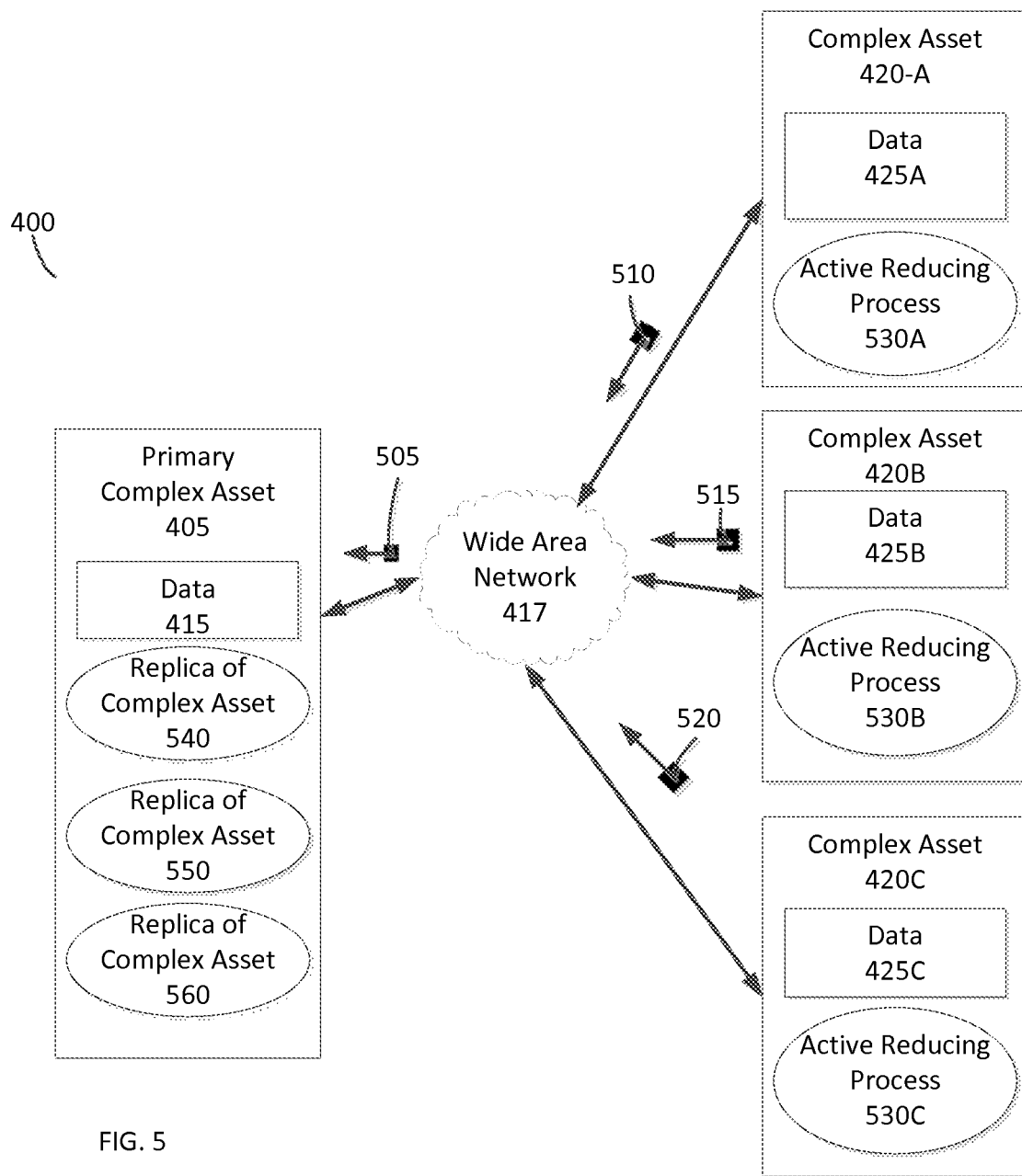
FIG. 5 is a simplified illustration of multiple complex assets reducing data in a multi complex asset data storage system, in accordance with an embodiment of the present disclosure.

Refer to the example embodiment of FIG. 5. FIG. 5 is a simplified illustration of multiple complex assets reducing data in a multi complex asset data storage system, in accordance with an embodiment of the present disclosure. As shown, primary complex asset 405 has completed mapping data 415 and executed a switchover of the reducing algorithm to complex assets 420. Complex Asset 420A is executing active reducing process 530A, Complex Asset 420B is executing active reducing process 530B, and Complex Asset 420C is executing active reducing process 530C. In many embodiments, two or more complex assets may be enabled to reduce portions of the data which may enable parallel processing of the reducing algorithm. In various embodiments, parallel processing may speed up the reducing process.

As shown, Complex assets 420 are being replicated on primary asset 405. Complex asset 420-A is being replicated using message 510 to create replica 540 on primary complex asset 405. Complex asset 420-B is being replicated using message 515 to create replica 550 on primary complex asset 405. Complex asset 420-C is being replicated using message 520 to create replica 560 on primary complex asset 405. Primary asset 405 receives message 505 from WAN 417, which can contain information in message 510, message 515, or message 520.

Figure 6:
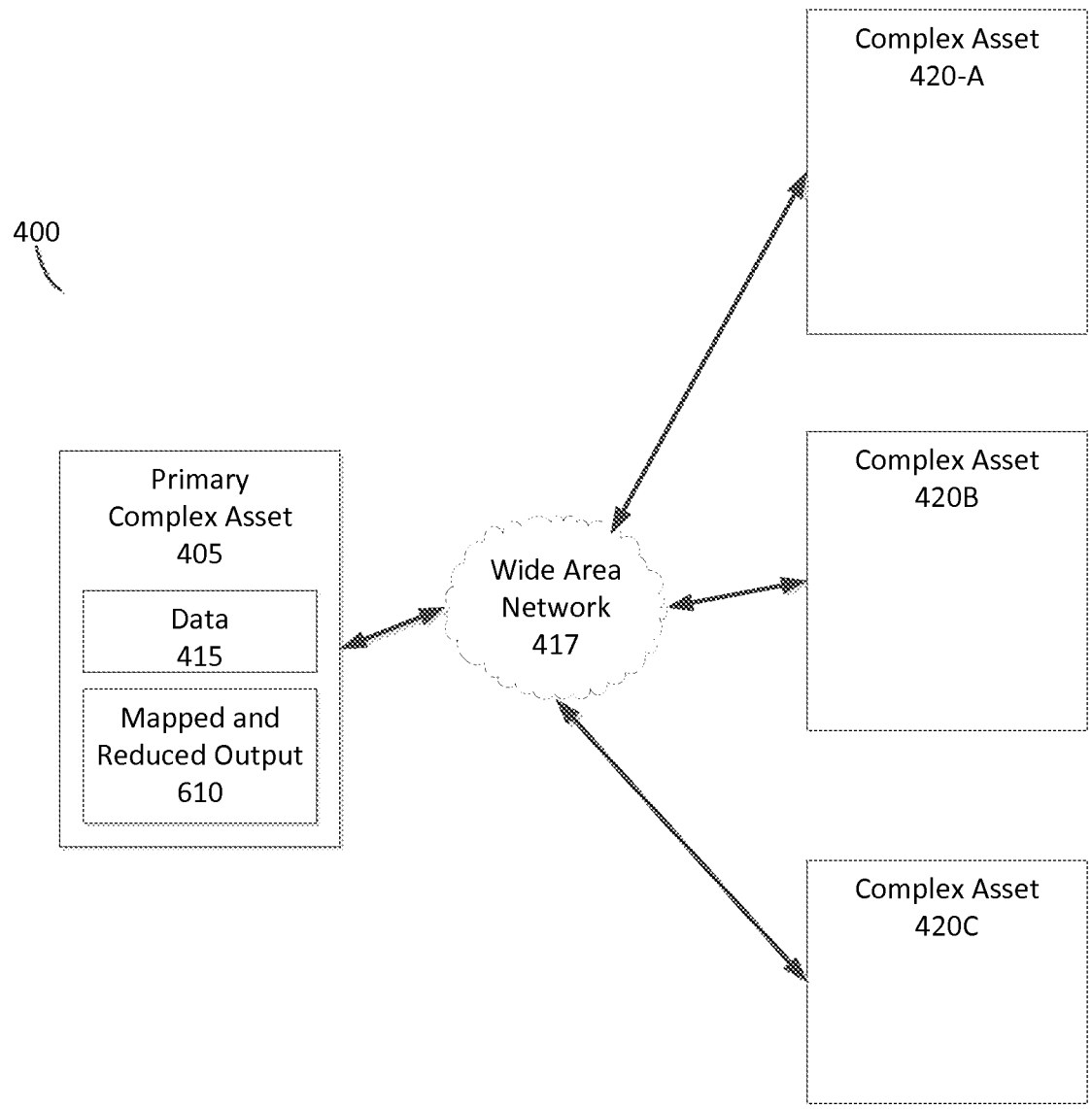
FIG. 6 is a simplified illustration of a complex asset after completing map/reduce processing in a multi-complex asset storage system, in accordance with an embodiment of the present disclosure.

Refer to the example embodiment of FIG. 6. FIG. 6 is a simplified illustration of a complex asset after completing map/reduce processing in a multi-complex asset storage system, in accordance with an embodiment of the present disclosure. Once Complex assets 420 completed reducing processing, complex assets 420 executes a switchover to primary complex asset 405. As Primary complex asset 405 included replicated data from complex assets 420, primary complex asset 405 was enabled to receive reduced data from complex Asset 420A, complex Asset 420B, and complex Asset 420C. In this embodiment, primary complex asset has merged received reduced data and merged the data into mapped and reduced output 610. Complex Assets 420 are re-initialized and are ready to start replicating primary complex asset 405 again.

Figure 7:
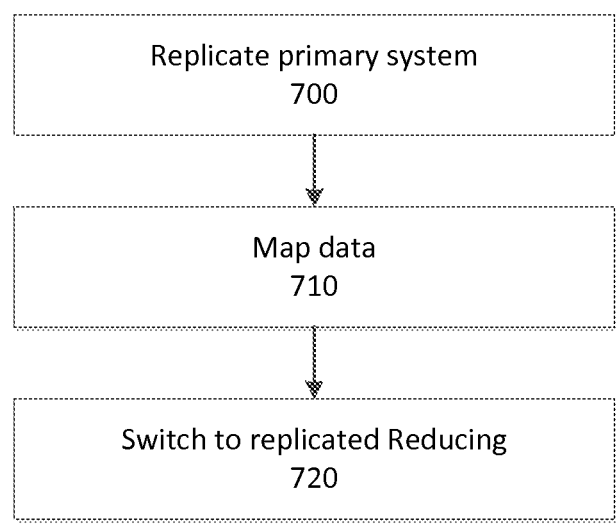
FIG. 7 is a simplified flowchart of a method of optimizing map/reducing processing in the multi complex Asset storage system of FIG. 4, in accordance with an embodiment of the present disclosure.

Refer to the example embodiment of FIGS. 4 and 7. FIG. 7 is a simplified flowchart of a method of optimizing map/reducing processing in the multi complex Asset storage system of FIG. 4, in accordance with an embodiment of the present disclosure. In this embodiment, primary complex asset 405 is being replicated on complex assets 420 (Step 700). Complex assets 420 mirror primary complex asset 405 which enables each of complex assets 420 to takeover if primary complex asset 405 fails. Complex assets 420 are enabled to takeover processing from primary complex asset 405 upon request and/or upon reaching a designated event. In this embodiment, Primary complex asset 405 is executing active mapping process 410 (Step 710). Upon completion of mapping, primary complex asset 405 creates a checkpoint and switches over to complex assets 420 to start reducing on replicated complex assets (Step 720).

Figure 8:
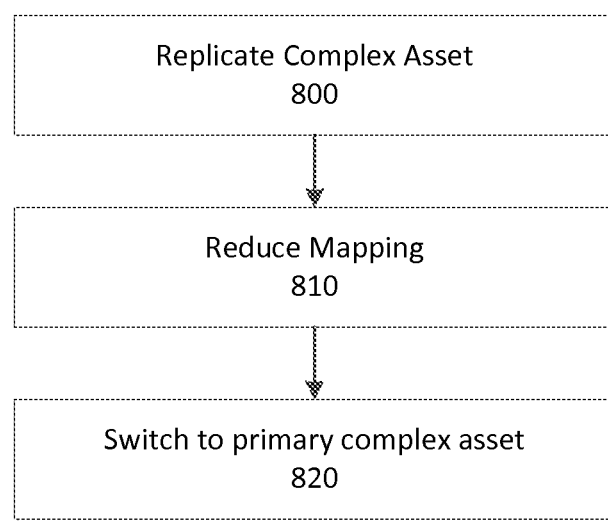
FIG. 8 is a simplified flowchart of a method of optimizing map/reducing processing in the multi complex asset storage system of FIG. 5, in accordance with an embodiment of the present disclosure.

Refer to the example embodiments of FIGS. 5 and 8. FIG. 8 is a simplified flowchart of a method of optimizing map/reducing processing in the multi complex asset storage system of FIG. 5, in accordance with an embodiment of the present disclosure. In FIG. 5, complex assets 420 are replicated to primary complex asset 405 (Step 800) in preparation for merging the reduced data processed on each of the complex assets. Complex Asset 420A is executing an active reducing process 530A (Step 810). Complex Asset 420B is executing an active reducing process 530B (Step 810). Complex Asset 420C is executing an active reducing process 530C (Step 810). Upon completion of reducing, multi-complex asset storage system 400 executes a switchover from complex assets 420 to primary complex asset 405 (Step 820). Primary complex asset 405 merges reducing data from replicas 540, 550, 560 to form results from mapping and reducing of the original data.

In most embodiments, the complex assets, map-reducing algorithms, and/or complex techniques involving complex assets referenced herein may be an extension of known data storage systems and/or techniques, such as in EMC RecoverPoint. EMC RecoverPoint is a trademark of EMC Corporation, Inc., having a principle place of business in Hopkinton, Mass., USA. An example of a Recovery of Complex Asset may be found in commonly-owned U.S. patent application Ser. No. 14/041,823, filed Sep. 30, 2013, entitled "METHODS AND APPARATUS FOR RECOVERY OF COMPLEX ASSETS IN DISTRIBUTED INFORMATION PROCESSING SYSTEMS" the contents of which are hereby incorporated by reference. An example of Complex Assets may be found in commonly-owned U.S. patent application Ser. No. 14/041,795, filed Sep. 30, 2013, entitled "METHODS AND APPARATUS FOR RECOVERY OF COMPLEX ASSETS IN DISTRIBUTED INFORMATION PROCESSING SYSTEMS" the contents of which are hereby incorporated by reference. An example of Map-Reducing may be found in commonly-owned U.S. patent application Ser. No. 14/040,943, filed Sep. 30, 2013, entitled "PATENT ANALYTICS USING MAPREDUCE CLUSTERING" the contents of which are hereby incorporated by reference. An example of Storing files in a parallel computing system may be found in commonly-owned U.S. patent application Ser. No. 13/536,369, filed Jun. 28, 2012, entitled "STORING FILES IN A PARALLEL COMPUTING SYSTEM BASED ON USER-SPECIFIED PARSER FUNCTION" the contents of which are hereby incorporated by reference.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 9:
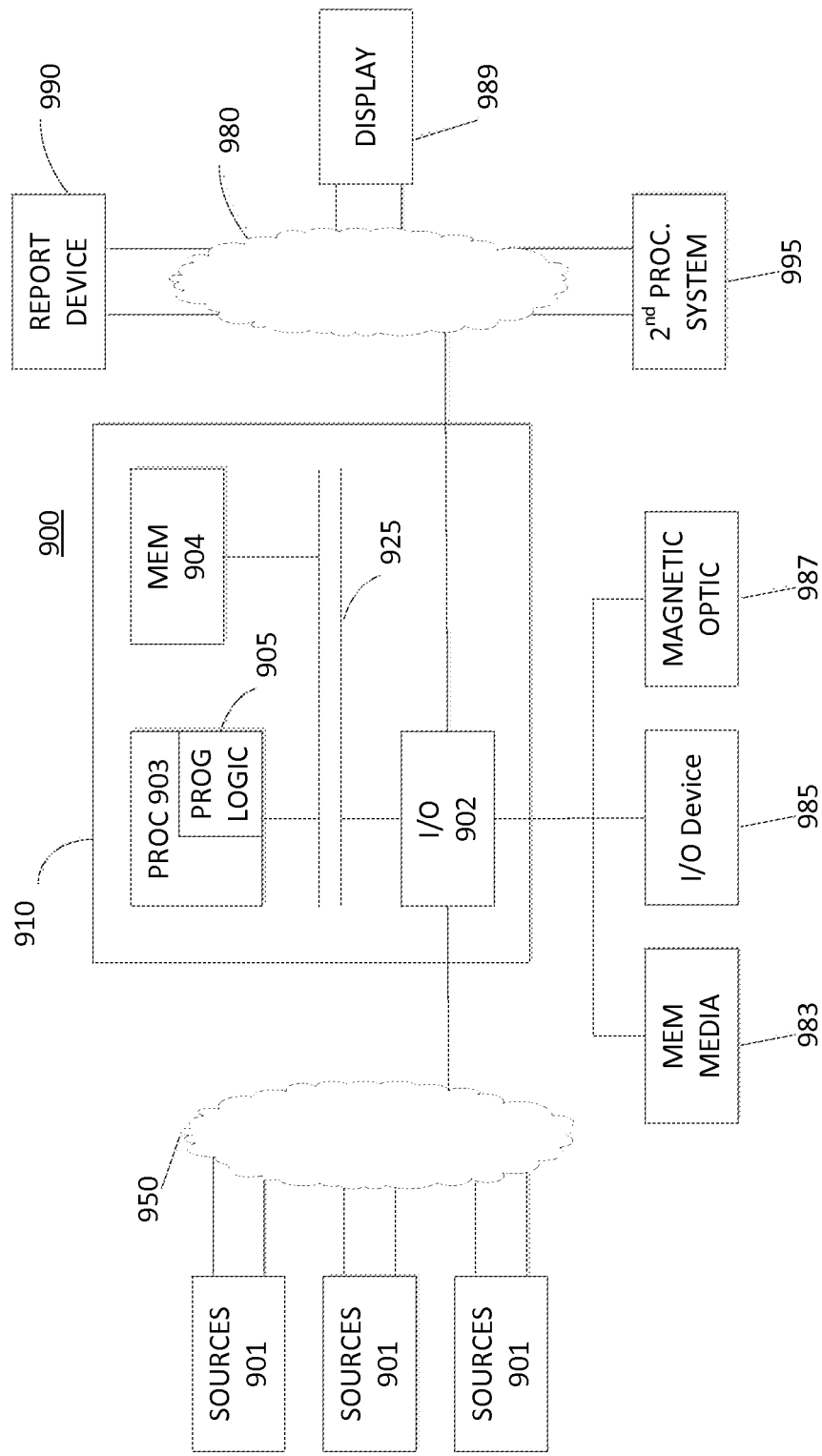
FIG. 9 is an example of an embodiment of an apparatus that may utilize the techniques described herein, in accordance with an embodiment of the present disclosure.

FIG. 9 is a block diagram illustrating an apparatus, such as a computer 910 in a network 900, which may utilize the techniques described herein according to an example embodiment of the present invention. The computer 910 may include one or more I/O ports 902, a processor 903, and memory 904, all of which may be connected by an interconnect 925, such as a bus. Processor 903 may include program logic 905. The one or more I/O ports 902 may provide connectivity to memory media 983, I/O devices 985, and drives 987, such as magnetic or optical drives. The computer 910 is configured to communicate with a plurality of sources 901 via a network 950 using the one or more I/O ports 902. The computer 910 is further configured to communicate with a display 989, a report device 990, and a second processing system 995 via a network 980 using the one or more I/O ports 902. When the program code is loaded into memory 904 and executed by the computer 910, the machine becomes an apparatus for practicing the invention. When implemented on one or more general-purpose processors 903, the program code combines with such a processor to provide a unique apparatus that operates analogously to specific logic circuits. As such, a general purpose digital machine can be transformed into a special purpose digital machine.

Figure 10:
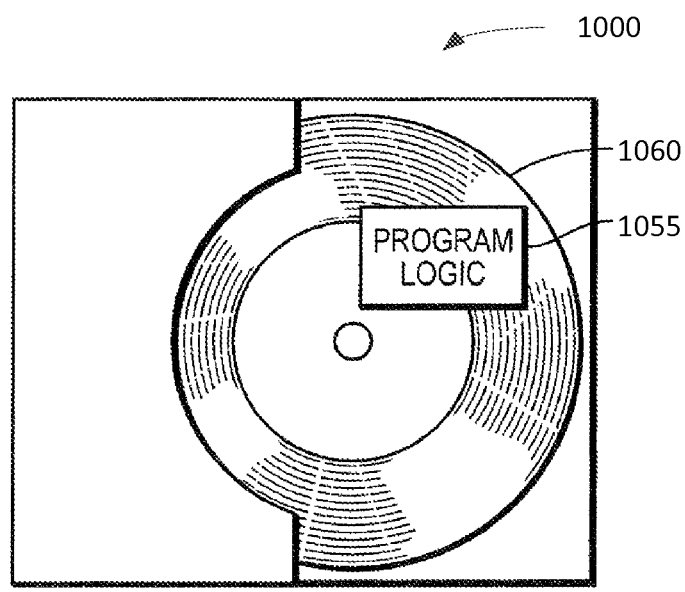
FIG. 10 is an example of a method embodied on a computer readable storage medium that may utilize the techniques described herein, in accordance with an embodiment of the present disclosure.

FIG. 10 is a block diagram illustrating a method embodied on a computer readable storage medium 1060 that may utilize the techniques described herein according to an example embodiment of the present invention. FIG. 10 shows Program Logic 1055 embodied on a computer-readable medium 1060 as shown, and wherein the Logic is encoded in computer-executable code configured for carrying out the methods of this invention and thereby forming a Computer Program Product 1000. Program Logic 1055 may be the same logic 905 on memory 904 loaded on processor 903 in FIG. 9. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of processing data utilizing map: reduce clustering on a data storage system including a primary data storage system and a plurality of secondary data storage systems, the computer-executable method comprising:
    performing continuous replication from the primary data storage system to the secondary data storage systems;
    processing a mapping of the data on the primary data storage system, wherein results of the mapping are replicated on the secondary data storage systems;
    creating a checkpoint on the primary data storage system and switching over to the secondary data storage systems, wherein the checkpoint is enabled to be activated upon reaching specified events;
    processing at least first and second instances of reducing of the data on respective first and second ones of the secondary data storage systems, wherein the first secondary data storage system is enabled to reduce a first distinct portion of the results of the mapping in parallel with the second secondary data storage system being enabled to reduce a second distinct portion of the results of the mapping; and
    merging results of the processing of the first and second instances of reducing by the respective secondary data storage systems;
    wherein the mapping is performed by the primary storage system and the instances of the reducing are performed on the replicated results of the mapping in the respective first and second secondary data storage systems, in accordance with a designated map-reduce algorithm;
    wherein the primary data storage system and the secondary data storage systems are each enabled to comprise a plurality of complex assets, each of the complex assets comprising one or more virtual machines provided by one or more hypervisors of a virtualization platform;
    wherein a first one of the complex assets of the primary data storage system is replicated to a second one of the complex assets of at least one of the secondary data storage systems as part of the continuous replication, for use in performing its corresponding one of the first and second instances of reducing the data; and
    the designated map-reduce algorithm thereby utilizing one or more complex assets replicated from the primary data storage system to at least one of the secondary data storage systems.

2. The computer-executable method of claim 1, further comprising upon completion of the mapping, executing a failover from the primary system to the secondary data storage systems.

3. The computer-executable method of claim 1, wherein at least one of the secondary data storage systems is enabled to operate at a greater quality of service than the primary data storage system.

4. The computer-executable method of claim 1, wherein upon a failure of the primary data storage system, the secondary data storage systems are enabled to a failover and continue the processing of the primary data storage system.

5. The computer-executable method of claim 1, further comprising:
    wherein the data storage system includes a tertiary data storage system;
    replicating the primary data storage system on the tertiary data storage system; and
    processing a third portion of reducing of the data on the tertiary data storage system.

6. The computer-executable method of claim 5, further comprising:
    replicating the secondary data storage system on the primary data storage system; and
    replicating the tertiary data storage system on the primary data storage system.

7. The computer-executable method of claim 6, further comprising:
    merging a result of the processing of the first and second portions of reducing with a result of the processing of the third portion of reducing on the primary data storage system.

8. A system, comprising:
    a data storage system including a primary data storage system and a plurality of secondary data storage systems; and
    computer-executable program logic encoded in memory of one or more computers in communication with the data storage system to enable processing of data utilizing map-reduce clustering on the data storage system, wherein the computer-executable program logic is configured for the execution of:
    performing continuous replication from the primary data storage system to the secondary data storage systems;
    processing a mapping of the data on the primary data storage system, wherein results of the mapping are replicated on the secondary data storage systems;
    creating a checkpoint on the primary data storage system and switching over to the secondary data storage systems, wherein the checkpoint is enabled to be activated upon reaching specified events;
    processing at least first and second instances of reducing of the data on respective first and second ones of the secondary data storage systems, wherein the first secondary data storage system is enabled to reduce a first distinct portion of the results of the mapping in parallel with the second secondary data storage system being enabled to reduce a second distinct portion of the results of the mapping; and merging results of the processing of the first and second instances of reducing by the respective secondary data storage systems;

wherein the mapping is performed by the primary storage system and the instances of the reducing are performed on the replicated results of the mapping in the respective first and second secondary data storage systems, in accordance with a designated map-reduce algorithm;

wherein the primary data storage system and the secondary data storage systems are each enabled to comprise a plurality of complex assets, each of the complex assets comprising one or more virtual machines provided by one or more hypervisors of a virtualization platform;

wherein a first one of the complex assets of the primary data storage system is replicated to a second one of the complex assets of at least one of the secondary data storage systems as part of the continuous replication, for use in performing its corresponding one of the first and second instances of reducing the data; and the designated map-reduce algorithm thereby utilizing one or more complex assets replicated from the primary data storage system to at least one of the secondary data storage systems.

9. The system of claim 8, wherein the computer-executable program logic is further configured for the execution of:
upon completion of the mapping, executing a failover from the primary system to the secondary data storage systems.

10. The system of claim 8, wherein at least one of the secondary data storage systems is enabled to operate at a greater quality of service than the primary data storage system.

11. The system of claim 8, wherein upon a failure of the primary data storage system, the secondary data storage systems are enabled to a failover and continue the processing of the primary data storage system.

12. The system of claim 8, wherein the computer-executable program logic is further configured for the execution of:
wherein the data storage system includes a tertiary data storage system;
replicating the primary system on the tertiary data storage system; and
processing a third portion of reducing of the data on the tertiary data storage system.

13. The system of claim 12, wherein the computer-executable program logic is further configured for the execution of:
replicating the secondary data storage system on the primary data storage system; and
replicating the tertiary data storage system on the primary data storage system.

14. The system of claim 13, wherein the computer-executable program logic is further configured for the execution of:
merging a result of the processing of the first and second portions of reducing with a result of the processing of the third portion of reducing on the primary data storage system.

15. A computer program product for processing data utilizing map-reduce clustering on a data storage system including a primary data storage system and a plurality of secondary data storage systems, the computer program product comprising:

a non-transitory computer readable medium encoded with computer-executable program code for using read signatures in replication, the code configured to enable the execution of:
performing continuous replication from the primary data storage system to the secondary data storage systems;
processing a mapping of the data on the primary data storage system, wherein results of the mapping are replicated on the secondary data storage systems;
creating a checkpoint on the primary data storage system and switching over to the secondary data storage systems, wherein the checkpoint is enabled to be activated upon reaching specified events;
processing at least first and second instances of reducing of the data on respective first and second ones of the secondary data storage systems, wherein the first secondary data storage system is enabled to reduce a first distinct portion of the results of the mapping in parallel with the second secondary data storage system being enabled to reduce a second distinct portion of the results of the mapping; and
merging results of the processing of the first and second instances of reducing by the respective secondary data storage systems;
wherein the mapping is performed by the primary storage system and the instances of the reducing are performed on the replicated results of the mapping in the respective first and second secondary data storage systems, in accordance with a designated map-reduce algorithm;
wherein the primary data storage system and the secondary data storage systems are each enabled to comprise a plurality of complex assets, each of the complex assets comprising one or more virtual machines provided by one or more hypervisors of a virtualization platform;
wherein a first one of the complex assets of the primary data storage system is replicated to a second one of the complex assets of at least one of the secondary data storage systems as part of the continuous replication, for use in performing its corresponding one of the first and second instances of reducing the data; and
the designated map-reduce algorithm thereby utilizing one or more complex assets replicated from the primary data storage system to at least one of the secondary data storage systems.

16. The computer program product of claim 15, wherein the code is further configured to enable the execution of:
upon completion of the mapping, executing a failover from the primary system to the secondary data storage systems.

17. The computer program product of claim 15, wherein at least one of the secondary data storage systems is enabled to operate at a greater quality of service than the primary data storage system.

18. The computer program product of claim 15, wherein upon a failure of the primary data storage system, the secondary data storage systems are enabled to a failover and continue the processing of the primary data storage system.

19. The computer program product of claim 15, wherein the code is further configured to enable the execution of:
wherein the data storage system includes a tertiary data storage system;
replicating the primary data storage system on the tertiary data storage system; and
processing a third portion of reducing of the data on the tertiary data storage system.

20. The computer program product of claim 19, wherein the code is further configured to enable the execution of:
    replicating the secondary data storage system on the primary data storage system; and
    replicating the tertiary data storage system on the primary data storage system.

\* \* \* \* \*